United States Patent [19]

Lang

[11] Patent Number: 5,920,581

[45] Date of Patent: Jul. 6, 1999

[54] ERROR DETECTION METHOD AND APPARATUS FOR DIGITAL COMMUNICATION DATA PACKETS

[75] Inventor: Ralph Uwe Lang, Richmond, Canada

[73] Assignee: VTech Communications, Ltd., Tai Po, The Hong Kong Special Administrative Region of the People's Republic of China

[21] Appl. No.: 08/655,985

[22] Filed: May 31, 1996

[51] Int. Cl.$^6$ .................................................. G06F 11/00
[52] U.S. Cl. ............................................. 371/48; 371/67.1
[58] Field of Search .............................. 371/49.3, 48, 53, 371/67.1; 370/242

[56] References Cited

U.S. PATENT DOCUMENTS

| | | | |
|---|---|---|---|
| 3,838,395 | 9/1974 | Suttill, Jr. et al. | 340/149 A |
| 4,353,065 | 10/1982 | Mori | 340/825.44 |
| 4,479,125 | 10/1984 | Mori | 340/825.44 |
| 4,529,980 | 7/1985 | Liontine et al. | 340/825.52 |
| 4,663,623 | 5/1987 | Lax et al. | 340/825.44 |
| 4,663,765 | 5/1987 | Sutphin et al. | 340/5 |
| 4,745,408 | 5/1988 | Nagata et al. | 340/825.44 |
| 4,783,654 | 11/1988 | Ichikawa | 340/825.44 |
| 5,285,443 | 2/1994 | Patsiokas et al. | 370/29 |
| 5,297,203 | 3/1994 | Rose et al. | 380/9 |
| 5,600,754 | 2/1997 | Gardner et al. | 395/2.3 |

OTHER PUBLICATIONS

Common air interface specification PMC Jun. 19, 1997 by European Telecommunications Standards Institute, Nov. 1994, Second Edition (I–ETS 300 131).

*Primary Examiner*—Phung M. Chung
*Attorney, Agent, or Firm*—Dick and Harris

[57] ABSTRACT

The present disclosure discloses an audio channel field for use in transmitting digital audio in a communication system. The audio channel field includes two or more nibbles of the digital audio, wherein a first nibble contains the most significant portion of the data and each of the nibbles are arranged most significant bit to least significant bit. The audio channel field further includes a channel check field calculated from one or more bits from each of the two or more nibbles selected from the most significant bit to least significant bit but in no event more than a portion of each of the nibbles. As disclosed, the channel check field can be calculated from two bits from each of the nibbles and may represent even or odd parity. The present disclosure also includes an error detection apparatus for detecting errors in a digital audio data transmitted from a sending station to a receiving station, utilizing the disclosed audio field. The apparatus includes a comparator for comparing the value of the channel check field and the output of a second channel check field calculator and further includes means for responding to the output from the comparator indicating non-equality of said channel check field and said second output by muting the audio and/or searching for a new transmission/reception channel for said communication system.

3 Claims, 2 Drawing Sheets

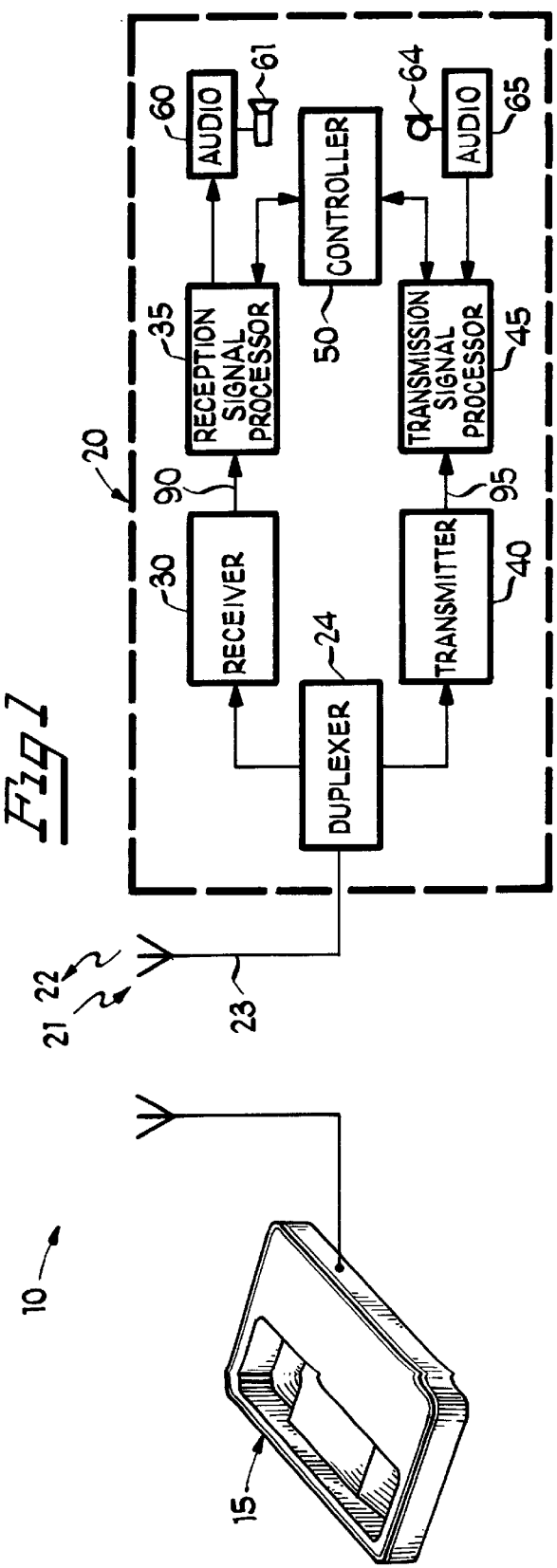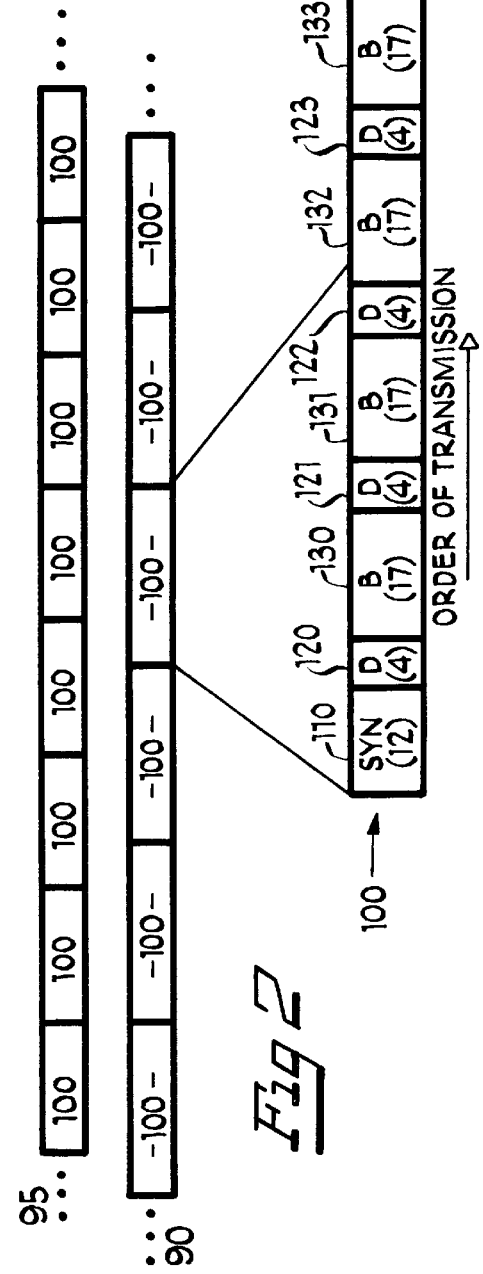

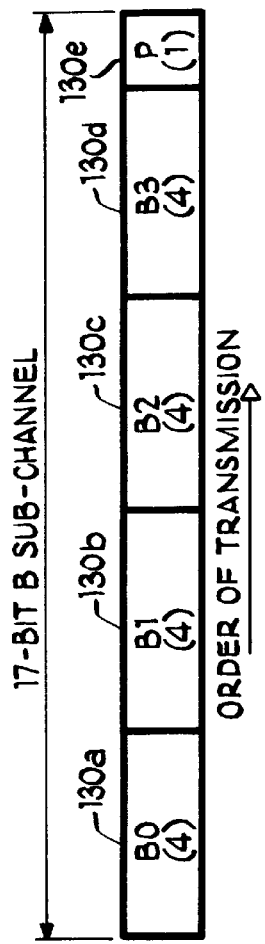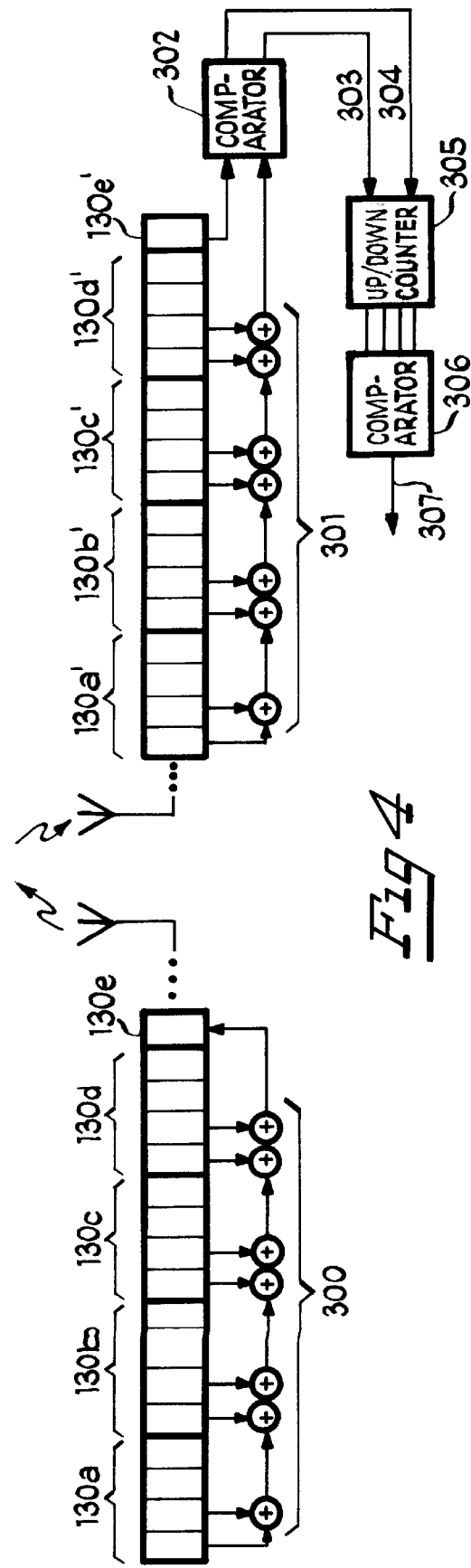

ERROR DETECTION METHOD AND APPARATUS FOR DIGITAL COMMUNICATION DATA PACKETS

BACKGROUND OF THE INVENTION

1. Field of the Invention

The present invention relates in general to digital radio communications and, in particular, to a method and apparatus for error detection in a stream of digital data.

2. Background Art

The transmission of digital data over a radio frequency communication link is very often implemented by transferring the digital data as discrete packets or frames of information from a transmitter to a receiver, as opposed to transferring the data as a continuous homogenous stream of data. In some digital communication systems multiple types, or configurations, of data packets each having different characteristics, such as length and data type, are employed. An example of such transmission of digital data over a radio frequency link may be found in the environment of a cordless telephone. In a digital cordless telephone system multiple types of data are transmitted including both voice data corresponding to the user's voice and command data corresponding to user activated keys and background operation of the phone.

In some digital cordless telephone systems, each packet is formed from the combination of command and audio data the integrity of which is enhanced by implementation of one of various error detection schemes. In these prior art systems having error detection/correction, the error correction data is usually calculated for a data packet as a whole and the resulting error detection/correction data is appended to a particular location in the packet. In practice, many of these error detection schemes require significant processing overhead, which can introduce delay in the transmission of the data over the radio link by requiring completion of processing before transmission can occur. Further, the segregation of synchronization, voice, command and error-detection/correction data in each frame creates an inherent delay in audio data transmission and processing caused by this arrangement of the packets. The segregation tends to require extensive buffering of the separate fields to facilitate bundling of the fields into a frame and, later to facilitate unbundling of those same frames into separate fields.

Inherent delay in digital communication is typically undesirable. Studies have shown that delay in digital audio path decreases the Mean Opinion Score (MOS) for the transmission system, wherein MOS is a commonly used assessment of the quality of the communication link as it relates to speech. This degradation in the observed quality of the communication system has been attributed to various cases, which often results from delay in the audio data path. While introduction of error detection/correction data adds delay, error detection is nevertheless critical to proper functioning of a communication system. Accordingly, it is an object of the present invention to provide an error detection scheme that minimizes delay in the audio path.

It is a further object of the present invention to provide an error detection method and apparatus that minimizes computational overhead, yet provides detection of errors throughout each frame.

These and other objects of the present invention will become obvious to those of ordinary skill in the art based upon the attached specification, drawings and claims.

SUMMARY OF THE INVENTION

The present invention relates to an audio channel field for use in transmitting digital audio in a communication system, and comprises an audio channel field having two or more nibbles of digital audio where the first one of said two or more nibbles contains the most significant portion of digital audio data contained in any of the nibbles and where each of the nibbles is arranged most significant bit to least significant bit. A channel check field calculated from one or more bits from each of the two or more nibbles selected from said most significant bit to least significant bit but in no event more than a portion of each of said two or more nibbles is also provided.

In the preferred embodiment of the present invention the channel check field is calculated from two bits from each of the two or more nibbles. The channel check field may represent even parity of the one or more bits or may alternatively represent odd parity of said one or more bits.

The present invention further comprises an error detection apparatus for detecting errors in digital audio data transmitted from a sending station to a receiving station, where the error detection apparatus comprises an audio channel field having two or more nibbles of digital audio data and a channel check field. The first one of the two or more nibbles contains the most significant portion of the digital audio data contained in any of said two or more nibbles and each of the said two or more nibbles are arranged most significant bit to least significant bit.

A first channel check field calculator associated with said sending station is provided and calculates a first output from one or more bits from each of said two or more nibbles selected from the most significant bit to least significant bit but in no event more than a portion of each of said two or more nibbles. The first output becomes the channel check field in the audio channel field. A second channel check field calculator associated with said receiving station is provided to calculate a second output from the one or more bits used by said first channel check field calculator. A comparator compares the value of said channel check field and said second output; and means for responding to an output from the comparator indicates any non-equality of said channel check field and said second output.

The error correction apparatus may further be used to trigger an audio muting circuit which mutes the audio in the event of the detection of non-equality of the channel check field and the second output. The apparatus may further be used to trigger initiation of a search protocol for locating a new transmission/reception channel for said communication system in the event of the detection of non-equality of the channel check field and the second output.

BRIEF DESCRIPTION OF THE DRAWINGS

FIG. 1 of the drawings is a block diagram of one radio communication system in which the presently disclosed error detection method and apparatus may be utilized;

FIG. 2 of the drawings is a block diagram of the received and transmitted data streams, and master frame utilized in a preferred embodiment of the present invention;

FIG. 3 of the drawings is a block diagram of the B-channel portion of the master frame; and FIG. 4 of the drawings is a schematic block diagram of the apparatus for error detection.

DETAILED DESCRIPTION OF THE DRAWINGS

While the present invention is susceptible of embodiment in many different forms and may be utilized in many different types of radio communication systems, there is shown in the drawings and will herein be described in detail, one specific embodiment with the understanding that the present disclosure can be considered as an exemplification of the principles of the invention and is not intended to limit the invention to the embodiments illustrated.

FIG. 1 of the drawings is a block diagram representation of one preferred digital radio communication system in which the present error detection method and apparatus can be practiced. In particular, FIG. 1 shows a cordless telephone system 10 having base unit 15 and handset unit 20. As base unit 15 and handset unit 20 in most cordless telephone systems have substantially identical data processing paths, only handset unit 20 will described in detail with the understanding that much of the description applies equally to base unit 15. Handset unit 20 receives and transmits digital signals 21 and 22, respectively, via antenna 23 and duplexer 24. Received digital signal 21 is recovered by receiver 30 in a manner which is independent of the inventive data format disclosed herein. Reception signal processor 35 operably accepts and processes received digital data stream 90 toward recovering voice and command data. The voice data is operably transmitted to audio recovery circuitry 60 and speaker 61 and the command data may be operably transmitted to controller 50. Transmission signal processor 45 combines voice data from audio encoder 65 and microphone 64 and command data from controller 50 to form transmitted digital data stream 95. Transmitted digital data stream 95 is then transmitted by transmitter 40 in a manner which is independent of the inventive data format disclosed herein.

As shown in FIG. 2, received and transmitted data streams 90 and 95 are comprised of a plurality of master frames 100. In a preferred embodiment each master frame 100 comprises a 12-bit synchronization field 110 followed immediately by four 4-bit D-channel subframes 120, 121, 122 and 123 interleaved between four 17-bit B-channel fields 130, 131, 132 and 133. The specific lengths of each field in master frame 100 were selected due to particular design choices, and more particularly, the desired 32 Kbit/s audio rate and parameters of cordless telephone system 10.

Specifically, the 96-bit length of master frame 100 chosen for the disclosed embodiment can be transmitted by the particular cordless telephone system 10 in approximately 2 msec resulting in an overall bit rate of 48 kbit/s. Inasmuch as each master frame 100 has 68 B-channel bits, the transmission rate results in a B-channel rate of 34 Kbit/s. As will be discussed more fully below, the 68 B-channel bits include 4 error-correction bits and 64 audio data bits. Accordingly, the effective audio data transfer rate for the selected field sizing is 32 Kbits/s, the desired bit rate for the selected environment. Of course, it is possible to design master frame 100 for various bit rates (particularly those divisible by 2) and transmission systems. This design must necessarily take into account other design parameters discussed hereinbelow, some of which constitute elements of the present invention.

Synchronization (SYNC) field 110 is a fixed synchronization pattern providing frame reference assistance to cordless telephone system 10 in recovering timing and frame alignment for received digital data stream 90. The selected 12-bit field length was the result of various trade-offs not relevant to the present invention. Each master frame 100 further includes four 4-bit D-channel subframes 120, 121, 122 and 123 for a total of 16 command channel bits. D-channel subframes 120, 121, 122 and 123 each contain a portion of the control channel data, least significant bit first. In a preferred embodiment of the present invention, the D-channel subfields are evenly interleaved between the B-channel subfields. The proportion of the D-channel data in each master frame 100 and the length of each D-channel subfield, like the design of SYNC field 110, is a matter of balancing various trade-offs. In most systems, the actual D-channel is much larger than the field size in the presently disclosed preferred embodiment, thus, the commands must be split across multiple master frame 100.

Each master frame 100 further contains four 17-bit B-channel subframes 130, 131, 132 and 133 as shown in FIG. 3. Each of the four 17-bit B-channel fields are identical, so for simplicity only one such field will be described in detail. As shown in FIG. 3, 17-bit B-channel subframe 130, in a preferred embodiment, contains 4 ADPCM audio data nibbles (i.e. 4 bits) 130a, 130b, 130c and 130d. Channel check field 130e comprises the seventeenth bit of 17-bit B-channel fields 130. Accordingly, each master frame 100 contains 64 digital audio bits and 4 error-correction bits.

As shown in FIG. 4, before transmission of any master frame 100, channel check field 130e is calculated by addition-tree 300, which determines the even parity of the first two most significant bits of each ADPCM nibbles 130a, 130b, 130c and 130d. On reception of each master frame 100, the portion of reception signal processor 35 shown in FIG. 4 verifies errorless transmission. In particular, addition-tree 301 recalculates the even parity of the first two most significant bits of each nibble 130a, 130b, 130c and 130d. The output of addition-tree 301 and the content of 130e' are fed into comparator 302, which outputs match signal 303 or no-match signal 304. In a preferred embodiment, match and no-match signals 303 and 304 are operably connected to down and up control of up/down counter 305. The output of up/down counter 305 is connected to comparator 306 such that if the output of counter 305 exceeds a predetermined value as determined by comparator 306 an error condition is deemed to exist. In this preferred embodiment, up/down counter 305 is prevented from rolling over. In one embodiment, the determination that an error has occurred as reflected by the condition of the output 307 of comparator 306 can be used to trigger the muting of the audio path with the circuitry to accomplish such muting being known to those skilled in the relevant art. An error condition may also serve to trigger a search for a new transmission/reception channel. Further, the error counting can be weighted by taking into consideration that the first audio data nibble— 130a in the foregoing description—contains the most significant data of all the audio data nibbles contained in master frame 100.

A number of improvements are facilitated by this design of the audio or B-channel. First, the short length of each of the four 17-bit B-channel fields 130, 131, 132 and 133 facilitates earlier error detection than possible with one large audio field. In fact, the smaller the audio packet or field and the more frequent the check field, the earlier errors can be detected and the lower the bit-rate (an undesirable side-effect). Accordingly, a field-size must be chosen to achieve a desired audio bit-rate; a design choice that is dependent on overall transmission rate, command field size, and selected digital-to-analog conversion technique. Second, the division of the 17-bit B-channel fields into still smaller nibbles upon which error-identification is based on only the first two most significant bits of each nibble minimizes processing overhead. Initially, the size of the packet provides close proximity between all bits in the field and easier access to each set of the most significant bits allowing the polling of fewer bits. As a result, the overhead associated with this error-identification is smaller and interspersed evenly within master frame 100, thus, spreading out error-detection throughout reception (or transmission) with a resulting minimization of delay for detection.

Furthermore, by counting the number of errors occurring within one or more master frames 100 and waiting to act upon those errors until they exceed a predetermined number, disruption in the audio channel is minimized. However the error count is calculated, once a predetermined threshold has been reached, system 10 can trigger a "mute" of the audio signal to avoid processing the error into the user's ear and/or can trigger some change in transmission characteristics based upon the system protocol in an attempt to improve signal quality.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An error detection apparatus for detecting errors in a digital audio data transmitted from a sending station to a receiving station, said digital audio data being arranged most significant bit to least significant bit, said error detection apparatus comprising:

an audio channel field having two or more nibbles of said digital audio data and a channel check field, each one of said two or more nibbles containing said most significant bits of said digital audio data not yet contained in any one of said two or more nibbles, said audio data within each of said two ore more nibbles being arranged most significant bit to least significant bit;

a first channel check field calculator associated with said sending station that calculates a first output from one or more bits from each of said two or more nibbles selected from said most significant bit to least significant bit but in no event more than a portion of each of said two or more nibbles, said first output becoming said channel check field in said audio channel field;

a second channel check field calculator associated with said receiving station that calculates a second output from said one or more bits used by said first channel check field calculator;

a comparator for comparing the value of said channel check field and said second output; and means for responding to an output from said comparator indicating non-equality of said channel check field and said second output.

2. The error detection apparatus of claim 1 wherein said means for responding including an audio muting circuit.

3. The error detection apparatus of claim 1 wherein said means for responding includes a search protocol for locating a new transmission/reception channel for communication between said sending and receiving stations.

* * * * *